May 1, 1951 L. O. LARSEN ET AL 2,551,380
CONSTANT LEVEL OILING APPARATUS FOR SLEEVE TYPE BEARINGS
Filed Oct. 30, 1946
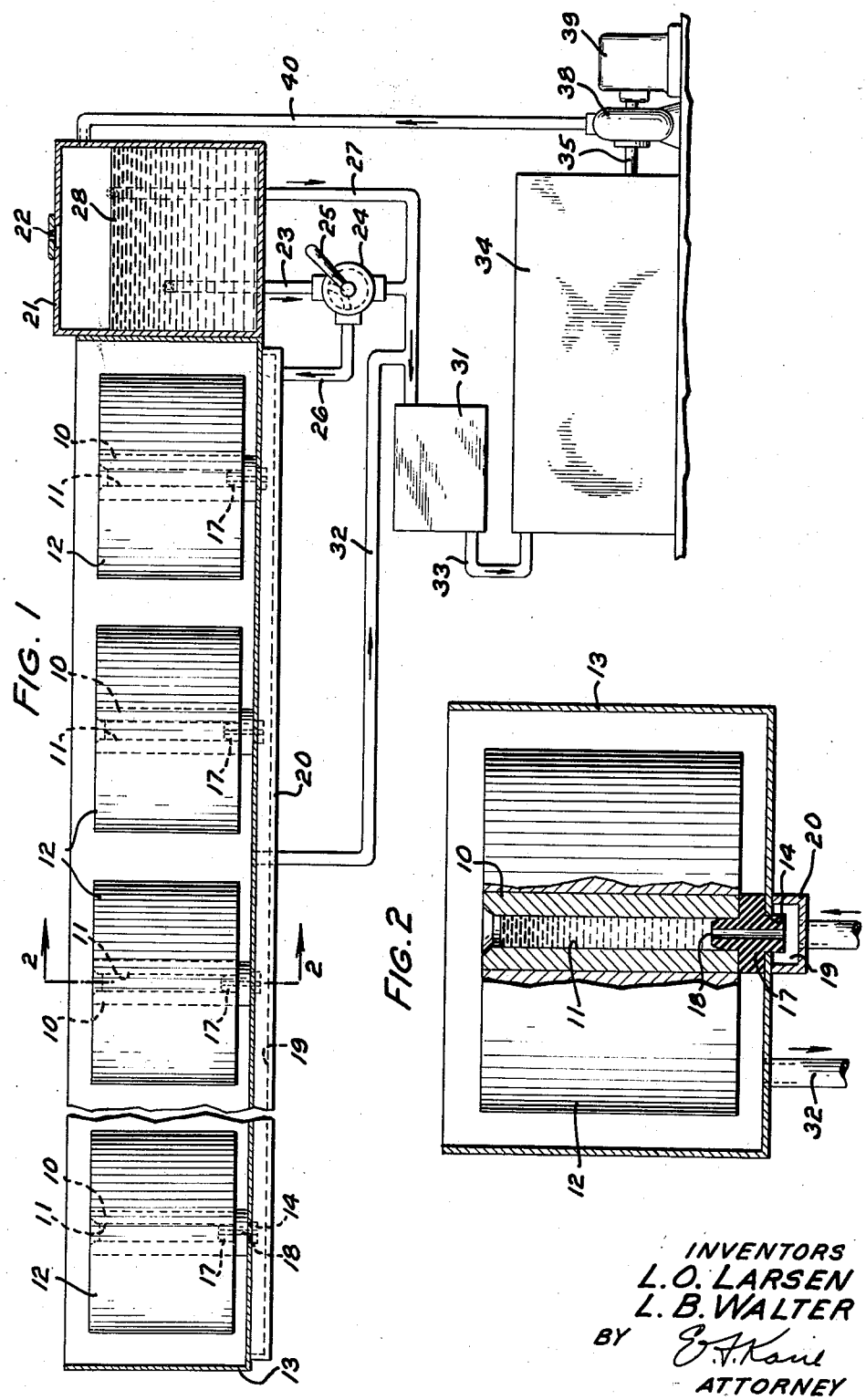
INVENTORS
L. O. LARSEN
L. B. WALTER
BY
ATTORNEY Patented May 1, 1951

2,551,380

UNITED STATES PATENT OFFICE 2,551,380

CONSTANT LEVEL OILING APPARATUS FOR SLEEVE TYPE BEARINGS

Leonard O. Larsen, Downers Grove, and Lawrence B. Walter, Elmhurst, Ill., assignors to Western Electric Company, Incorporated, New York, N. Y., a corporation of New York Application October 30, 1946, Serial No. 706,602

4 Claims. (Cl. 91—18)

This invention relates to constant level oiling apparatus and more particularly to such an apparatus for oiling sleeve type bearings prior to their assemblage with elements with which they are to be used.

In the manufacture of potentiometers a shaft bearing which extends through the center of the coils of the potentiometer must be well lubricated with a relatively permanent lubrication. However, the lubrication of this bearing before assembly in the apparatus has not been feasible and accordingly it is necessary to lubricate the bearing after assembling the apparatus. Since the lubricant might damage the apparatus, it is not practicable to use a dipping or spraying process on these bearings to insure a proper impregnation of the bearing material.

An object of this invention is the provision of a simple constant level oiling apparatus for efficiently oiling bearings prior to their assemblage with elements with which they are to be used.

In accordance with one embodiment of the invention as applied to the simultaneous oiling of a plurality of sleeve-type bearings for subsequent use in potentiometers, there is provided a rack tray or pan having a plurality of shouldered neoprene fittings arranged along the bottom wall thereof and extending therethrough for supporting the bearings upon upper reduced ends thereof within the pan, the lower ends of the fittings being in communication with an oil feeding passage sealed off from the interior of the pan and attached to the bottom wall thereof, the passage in turn being in communication by conduit with a suitably supplied constant level oil supply container and from which oil is fed to the passage and through each of the fittings to constantly feed the oil interiorly to a common level in each of the bearings equal to the level of the oil in the supply container.

Other objects and advantages of the present invention will be more apparent from the following detailed description taken in conjunction with the accompanying drawing, in which Fig. 1 is a diagrammatic elevational fragmentary view, partly in section, of a constant level oiling apparatus embodying the features of the invention; and Fig. 2 is an enlarged vertical cross sectional view taken on the line 2—2 thereof.

Referring to the drawing in detail, the constant level oiling apparatus of this invention is shown applied to the oiling of sleeve type absorbent bearings, such as are composed of an "oilite" composition and used in potentiometers, the bearings being oiled prior to their assemblage on shafts (not shown). A bearing of the above-described type, indicated at 10, and provided with an aperture 11 of circular contour, is surrounded by a housing 12, which is firmly attached to the periphery of the bearing. Immediately prior to the oiling of the bearing 10, and while attached to the housing 12, the assemblage is heat treated in a furnace (not shown) to remove therefrom any moisture contained in the absorbent "oilite" composition of the bearings and to open up the pores of the absorbent bearing to facilitate the oiling thereof.

An oiling apparatus embodying the features of the invention and shown particularly in Fig. 1, comprises a rack pan or tray 13 of suitable dimensions to accommodate a plurality of bearings 10. In the illustrated embodiment, the pan 13 is capable of handling a single row of bearings 10, but it will be understood that the pan may be of such dimensions that several rows of bearings in a common plane may be accommodated. Fitted into apertures 14 (Fig. 2) in the bottom wall of the pan 13 are externally shouldered fittings or bushings 17 of yieldable neoprene. As shown clearly in Fig. 2, the lower reduced end of the bushing 17 is suitably dimensioned to provide a tight fit in the aperture 14 to provide a fluid tight connection therebetween and the upper reduced end of the bushing is suitably tapered and dimensioned for entrance into the aperture 11 of the bearing 10 and at the same time to expose a maximum area thereof to oil and provide a fluid tight connection therewith. A central longitudinal aperture or bore 18 in the bushing 17 communicates at opposite ends with the bearing aperture 11 and a passage 19 provided in a channel-shaped member 20 extending longitudinally of the pan 13 and in line with each of the bushings 17 so that each of the bushings apertures or bores 18 is in communication with the passage 19, the member 20 being attached and sealed to the bottom wall of the pan 13.

At the right hand end of the rack pan 13 is an oil supply container 21 having its bottom wall in the plane of the bottom wall of the pan and having a vented cap 22. In communication with the interior of the container 21 is an outlet conduit 23 connected to one port of a three-way valve 24 provided with an actuating handle 25. The valve 24 has another port connected to a conduit 26 in communication with the passage 19 of the member 20. A third port of the valve 24 is connected to an overflow conduit 27, which is in communication at its upper end with the interior of the container 21 at a predetermined height above its bottom wall to maintain the level of oil, indicated at 28, constant in the container. At its lower end, the overflow conduit 27 communicates with an oil filter 31. Intermediate the valve 24 and the filter 31, the overflow conduit 27 communicates with one end of a conduit 32 having its opposite end in communication with the interior of the rack pan 13 through its bottom wall. The latter conduit 32, merely serves as a means to drain the pan 13 of any oil which might accidentally accumulate therein for various reasons since, in the normal operation of the apparatus, the pan does not contain any oil. From the filter 31, the cleaned oil passes through a conduit 33 into an oil reservoir 34, which is in communication, through a conduit 35, with an oil pump 38 driven by a suitable motor 39. From the pump 38, the oil is delivered to the tank 21 by means of a conduit 40.

In the use of the apparatus for oiling the described type of bearings 10, the bearings, with their housings 12, which have just been heat-treated to approximately 140° F. to remove any moisture contained therein and to open up the pores thereof for more readily absorbing oil, are lowered into the rack pan 13 and pressed onto the upper reduced ends of the neoprene fittings or bushings 17 and against the annularly defined seats thereof, which serve as the sole supports for the bearings. At the time of so mounting the bearings 10 onto the bushings 17, it will be understood that no oil is contained in the bores 18 of the bushings, since any oil therein, after the previous oiling of a plurality of bearings 10 had drained back into the passage 19 and thence through the conduit 26, valve 24, conduit 27 and through the filter 31 and conduit 33 to the sump 34. This was effected by a 90 degree actuation of the valve 24 from its position shown in broken outline in Fig. 1 by means of its handle 25, which served to shut off the oil from the supply container 21 through the conduit 23, valve 24 and conduit 26 to the passage 19, which is in communication with each of the bushings 17 and opened the conduit 26 to the conduit 27, which at the same time is carrying the overflow oil from the container 21 to the reservoir 34, the oil level indicated at 28 still being maintained in the container 21.

After the mounting of a plurality of heated bearings 10 with their housings 12 onto the upper ends of the neoprene bushings 17, the valve 24 is actuated to the position shown in Fig. 1, whereupon the oil from the container 21 flows by gravity through the conduit 23, valve 24, conduit 26, passage 19, bores 18 of the bushings 17 and into the apertures 11 of the bearings 10, where it rises to a common level, as indicated in each of the bearing apertures 11 equal to the constant oil level 28 in the container 21 and is constantly maintained at such level. After subjecting the bearings 10 to the oil for a predetermined period of time, the valve 24 is actuated in the manner previously referred to, whereupon the oil drains from the bearing apertures 11, bushing bores 18, passage 19 and back to the reservoir 34, as hereinbefore described. The oiled bearings 10 are now removed from the bushings 17 and another group of bearings mounted in position and the cycle is repeated.

What is claimed is:

1. An oiling apparatus for oiling a sleeve-type absorbent bearing having a bearing aperture comprising a stationary support, a vertically arranged bored member of yieldable material mounted on said stationary support and having a tapered and shouldered upper end portion adapted to be entered into the lower end of the bearing aperture for providing a frictional fluid-tight connection to and a rigid annularly defined seat effective to serve as the sole support for the bearing, said tapered upper end portion being effective to expose a maximum area of the bearing aperture to oil, the bore of said member communicating with the bearing aperture, and oil supply container, means for maintaining the oil in the container at a predetermined level, means for interconnecting the container and the bore of said member to flow oil into the bearing aperture to a level of that of the oil in the container.

2. An oiling apparatus for oiling a sleeve-type absorbent bearing having a bearing aperture comprising a stationary support, a vertically arranged bored member of yieldable material and having a shouldered upper end portion peripherally tapered for an appreciable portion at its upper end and adapted to be entered into the lower end of the bearing aperture for providing a frictional fluid-tight connection to and a rigid annularly defined seat effective to serve as the sole support for the bearing, said tapered upper end portion being effective to expose a maximum area of the bearing aperture to oil, the bore of said member communicating with the bearing aperture, an oil supply container, means for maintaining the oil in the container at a predetermined level, means for interconnecting the container and the bore of said member to flow oil into the bearing aperture to a level of that of the oil in the container.

3. An oiling apparatus for oiling a gang of sleeve-type absorbent bearings having bearing apertures comprising a stationary tray having a plurality of apertures in a bottom wall thereof, a plurality of vertically arranged bored members of yieldable material and having shouldered upper end portions and at their lower ends frictional fluid-tight connections with said tray apertures and adapted, at their upper shouldered end portions, to be entered into lower ends of the bearing apertures for providing fluid-tight connections to and rigid annularly defined seats effective to serve as the sole support for the bearings, said upper end portions of said members each having a peripherally tapered portion effective to expose maximum areas of the bearing apertures to oil, the bores of said members communicating with the bearing apertures, means for draining said tray, and means for flowing oil into each of the bearing apertures through said bored members and maintaining it at constant predetermined common levels in the bores of said members.

4. An oiling apparatus for oiling a gang of sleeve-type absorbent bearings having bearing apertures comprising a stationary tray having a plurality of apertures in a bottom wall thereof, a plurality of vertically arranged externally shouldered bored members of neoprene having frictional fluid-tight connections at lower reduced ends thereof with said tray apertures and adapted, at the upper reduced peripherally tapered end portions thereof, to be entered into lower ends of the bearing apertures for providing frictional fluid-tight connections to and rigid annularly defined seats effective to serve as the sole support for the bearings, said tapered upper end portions being effective to expose maximum areas of the bearing apertures to oil, the bores of said members communicating with the bearing apertures, and a constant level oil supply, means in communication with each of the bores of said members and having the oil level therein substantially in the plane of the upper ends of the bearing apertures for flowing oil thereinto from said means to common levels equal to the level of the oil in said means.

LEONARD O. LARSEN.
LAWRENCE B. WALTER.

REFERENCES CITED

The following references are of record in the file of this patent:

UNITED STATES PATENTS

| Number | Name | Date |
|---|---|---|
| 499,797 | Mundy | June 20, 1893 |
| 1,019,532 | Salm | Mar. 5, 1912 |
| 1,191,216 | Nivling | July 18, 1916 |
| 2,016,060 | Strauch | Oct. 1, 1935 |
| 2,069,212 | Buffington | Feb. 2, 1937 |
| 2,291,112 | Slack | July 28, 1942 |